UNITED STATES PATENT OFFICE.

HENRY DANZER, OF PARIS, FRANCE.

PROCESS FOR RECOVERING THE MATERIAL OF THE SUPPORT OF KINEMATOGRAPHIC FILMS AND WASTE PORTIONS OF THE SAME.

1,065,115.  Specification of Letters Patent.  Patented June 17, 1913.

No Drawing.  Application filed July 6, 1909.  Serial No. 506,105.

*To all whom it may concern:*

Be it known that I, HENRY DANZER, a citizen of the French Republic, residing at Paris, in the Department of the Seine, France, have invented certain new and useful Improvements in Processes for Recovering the Material of the Support of Kinematographic Films and Waste Portions of the Same, of which the following is a specification.

This invention refers to a process for recovering the material of the support of kinematographic films.

It consists in depriving used, unsold or other films of their gelatin for the purpose of recovering, 1, the metallic silver of the pictures; 2, the material forming the support without occasioning any alteration of the said material. For this purpose preparations containing soluble proteolytic ferments (pepsin, trypsin, papain or the like) or living ferments (liquefying bacteria and the like) are used.

When using soluble ferments, the preparations will be obtained either by the direct solution of the ferments or by macerating vegetal or animal parts, either by macerating several different parts some of which may contain strengthening diastases.

The materials to be treated will be submitted to the action of the liquids obtained during the time necessary for hydrating, digesting or liquefying the gelatin: this time will vary according to the products employed, the concentration of the liquids and the temperature.

For the sake of example, the films to be treated, comprising the celluloid bands or supports coated with the insoluble gelatino-bromid emulsion, are plunged into a diluted solution of commercial trypsin, heated to a temperature of about forty degrees Celsius; in this case, the solution will be effected very rapidly, owing to the fact that the trypsin converts the gelatin into peptones which are readily dissolved in cool or tepid water. The solution terminated, the material of the support (in the form of bands) will be washed for the purpose of removing all kinds of impurities and the metallic silver (or in the form of a salt) will be carefully collected.

Having now particularly described and ascertained the nature of my said invention and in what manner the same is to be practised, I declare that what I claim is:

1. A process for removing the gelatin coating from the support of a developed kinematographic film, which consists in subjecting said film to the action of a solution containing a proteolytic ferment, in order to convert said insoluble gelatin coating into a soluble peptone, and then washing said support.

2. The process of removing the gelatin coating from the support of a developed kinematographic film, which consists in placing said film in a dilute solution of trypsin heated to about forty degrees Celsius, and then washing said support.

In testimony whereof I affix my signature in presence of two witnesses.

HENRY DANZER.

Witnesses:
CAMES DANZER,
MUESS CRESPIN.